(12) United States Patent
Kraus et al.

(10) Patent No.: US 9,481,516 B1
(45) Date of Patent: Nov. 1, 2016

(54) ROBOTIC SORTATION SYSTEM (71) Applicant: Intelligrated Headquarters, LLC, Mason, OH (US)

(72) Inventors: Timothy W. Kraus, Cincinnati, OH (US); Eric Wade Sweazy, Danville, KY (US)

( * ) Notice: Subject to any disclaimer, the term of this patent is extended or adjusted under 35 U.S.C. 154(b) by 142 days.

(21) Appl. No.: 14/211,372

(22) Filed: Mar. 14, 2014

Related U.S. Application Data (60) Provisional application No. 61/802,179, filed on Mar. 15, 2013.

(51) Int. Cl.
*G06F 7/00* (2006.01)
*B65G 1/137* (2006.01)

(52) U.S. Cl.
CPC ..................... *B65G 1/137* (2013.01)

(58) Field of Classification Search
USPC ........................................................ 700/230
See application file for complete search history.

(56) References Cited

U.S. PATENT DOCUMENTS

| | | | |
|---|---|---|---|
| 4,692,876 A | 9/1987 | Tenma et al. | |
| 5,605,432 A | 2/1997 | Fink et al. | |
| 6,059,092 A | 5/2000 | Jerue et al. | |
| 7,347,120 B2 | 3/2008 | Friedrich et al. | |
| 7,516,835 B2 | 4/2009 | Neiser et al. | |
| 2005/0241494 A1* | 11/2005 | Davi | B25J 9/1697 99/443 C |
| 2008/0023294 A1* | 1/2008 | Moore | B65G 47/841 198/370.02 |
| 2009/0120764 A1* | 5/2009 | Hysell | B65G 47/844 198/370.02 |
| 2009/0223779 A1* | 9/2009 | Szarkowski | B65G 47/766 198/370.08 |
| 2010/0234988 A1 | 9/2010 | Buckingham et al. | |
| 2010/0249991 A1* | 9/2010 | Asano | B65G 47/5145 700/218 |
| 2012/0165972 A1* | 6/2012 | Wappling | B25J 9/1687 700/213 |
| 2012/0253507 A1* | 10/2012 | Eldershaw | B65G 47/00 700/218 |
| 2013/0126401 A1* | 5/2013 | Samarkos | B03B 9/06 209/645 |
| 2015/0114799 A1* | 4/2015 | Hansl | B65G 1/1378 198/601 |

FOREIGN PATENT DOCUMENTS

| | | |
|---|---|---|
| JP | 11-151692 | 6/1999 |
| JP | 2001-301930 | 10/2001 |
| WO | WO 2013/042184 | 2/2013 |
| WO | WO 2013/042185 | 3/2013 |

OTHER PUBLICATIONS

Abstract and English Machine Translation of Japanese Patent JP 11-151692.
Abstract and English Machine Translation of Japanese Patent JP 2001-301930.

* cited by examiner

*Primary Examiner* — Kyle Logan (57) ABSTRACT

A material handling system comprises a main conveyor, a branch conveyor, and a robotic line sorter. The robotic line sorter comprises a robotic arm and an end effector operable to engage an article. The robotic line sorter is operable to perform one or a combination of the functions of orienting, aligning, gapping, and/or moving an article from the main conveyor to the branch conveyor. The material handling system may further comprise a scanner configured to read and communicate information from an article to the robotic line sorter. The robotic line sorter may be configured to deliver an article to the branch conveyor in a predetermined order, until a predetermined condition is met, or based upon a predetermined characteristic.

12 Claims, 9 Drawing Sheets

ROBOTIC SORTATION SYSTEM

CROSS-REFERENCE TO RELATED APPLICATIONS

This application claims priority from U.S. Provisional Patent Application Ser. No. 61/802,179, filed on Mar. 15, 2013, the disclosure of which is incorporated herein by reference in its entirety.

TECHNICAL FIELD

The present disclosure relates generally to article sortation systems, and is more particularly directed to a system which provides efficient sortation of articles. The innovation will be disclosed in connection with, but not necessarily limited to, sortation conveyors with control systems which selectively direct or manipulate the route of articles based on predetermined characteristics.

BACKGROUND

In conveyor systems for conveying and distributing articles, a series of conveyed articles are typically transported along moving conveying surfaces. Such conveyor systems will typically include one or more sortation devices which divert selected articles from a primary conveying path onto one or more secondary conveying paths. Improvements in efficiency of a sortation system improve the article handling performance by improved accuracy and throughput.

BRIEF DESCRIPTION OF THE DRAWINGS

The accompanying drawings together with specification, including the detailed description which follows, serve to explain the principles of the present invention.

DETAILED DESCRIPTION

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Figure 1:
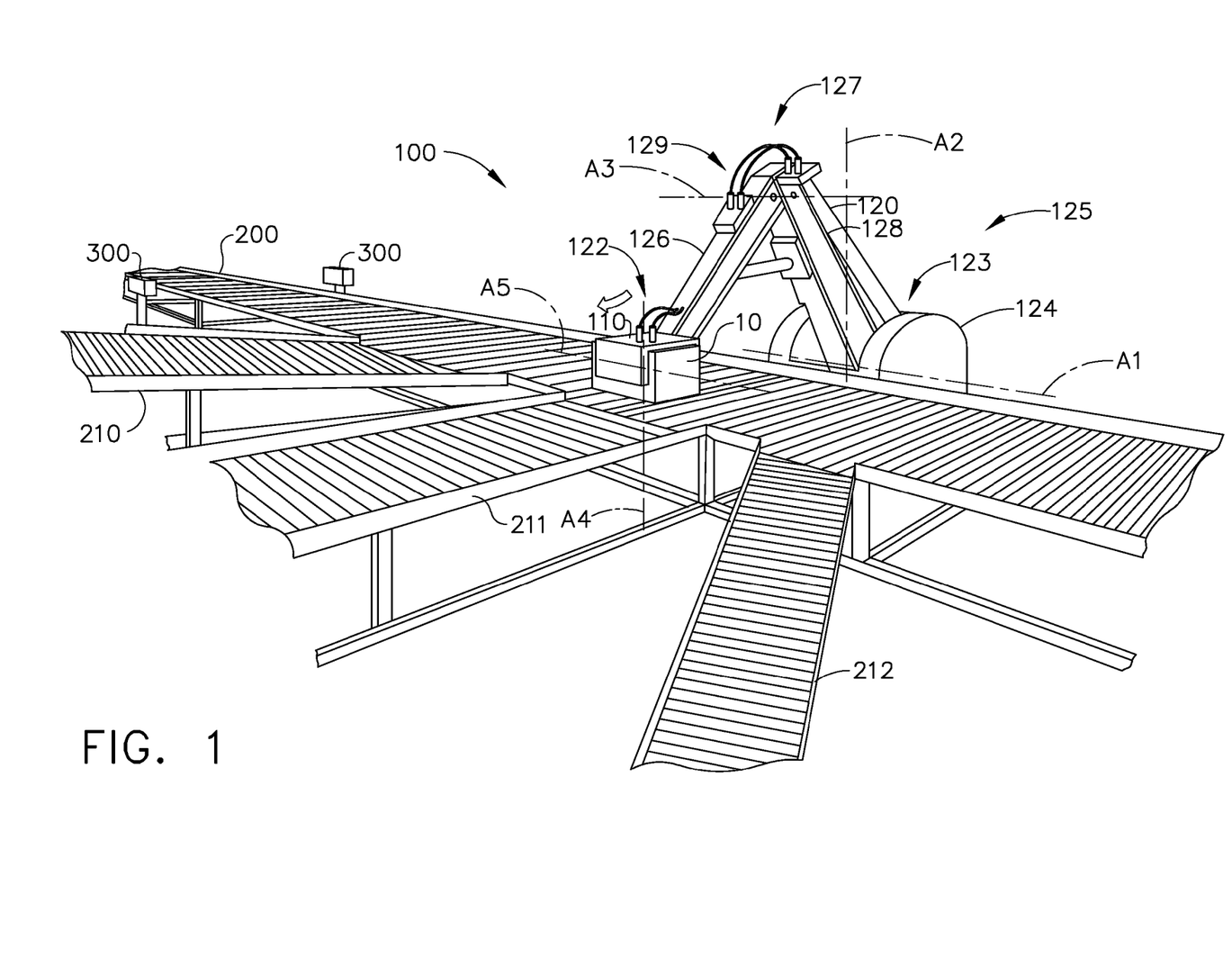
FIG. 1 is a perspective view of a robotic line sorter.

As shown in FIG. 1, robotic line sorter 100 includes end effector 110 and robotic arm 120. Robotic line sorter 100 of the present example is positioned at an intersection of main conveyor 200 and plurality of branch conveyors 210, 211, 212. Robotic arm 120 comprises first section 126, second section 128, and base section 124. Base section 124 may be coupled to the floor and is configured to rotate about axis A2 transverse to the floor. Base section 124 comprises distal end 125. Second section 128 comprises proximal end 123. Second section 128 is coupled to distal end 125 of base section 124 at proximal end 123 of second section 128. Second section 128 is configured to rotate about longitudinal axis A1 located along the coupling point of proximal end 123 of second section 128 and distal end 125 of base section 124. Second section 128 also comprises distal end 127. First section 126 comprises proximal end 129. First section 126 is coupled to distal end 127 of second section 128 at proximal end 129 of first section 126. First section 126 is configured to rotate about longitudinal axis A3 located along the coupling point of proximal end 129 of first section 126 and distal end 127 of second section 128. Rotation about longitudinal axis A3, longitudinal axis A1, and axis A2 allows robotic arm 120 to replicate the movement of a human arm by moving and manipulating itself in a variety of desired directions and distances.

First section 126 also comprises distal end 122. End effector 110 is coupled to distal end 122 of first section 126. End effector 110 is configured to rotate about axis A4 transverse to a coupling plane of end effector 110 and distal end 122 of first section 126; axis A5 longitudinal to the coupling plane of end effector 110 and distal end 122 of first section 126 and transverse to axis A4; and axis A6 transverse to both axis A4 and axis A5. End effector 110 is also configured to be capable of grasping article 10. End effector 110 is also configured to be capable of pushing article 10 in lieu of or in addition to grasping article 10. When pushing article 10 end effector 110 may gently contact article 10 and after contact gradually accelerate article 10 transversely across or longitudinally along either main conveyor 200 or branch conveyors 210, 211, 212 similar to the sortation method disclosed in U.S. Pat. No. 7,516,835, titled "Sortation Conveyor," issued Apr. 14, 2009, the disclosure of which is incorporated by reference herein. Rotation about axis A4, axis A5, axis A6, and the grasping capability of end effector 110 allows end effector 110 to replicate the movement and abilities of a human hand.

Although robotic line sorter 100 of the present example utilizes robotic arm 120 configured as described above, other configurations may be utilized and would be apparent to one skilled in the art. For instance: a gantry robotic arm such as that disclosed in U.S. Pat. No. 5,605,432, titled "Robot Manipulator," issued Feb. 25, 1997, the disclosure of which is incorporated by reference herein; an articulated robotic arm such as that disclosed in U.S. Pat. Pub. No. 2010/0234988, titled "Robotic Arm With a Plurality of Articulated Segments," published Sep. 16, 2010, the disclosure of which is incorporated by reference herein; and/or a SCARA-type robotic arm such as that disclosed in U.S. Pat. No. 7,347,120, titled "Robot of Scara Type," issued Mar. 25, 2008, the disclosure of which is incorporated by reference herein.

Although robotic line sorter 100 of the present example is secured to the floor by base section 124, it should be understood that robotic line sorter 100 need not be secured to the floor. For instance, robotic line sorter 100 may be positioned above main conveyor 200 in order to save floor space.

Figure 2:
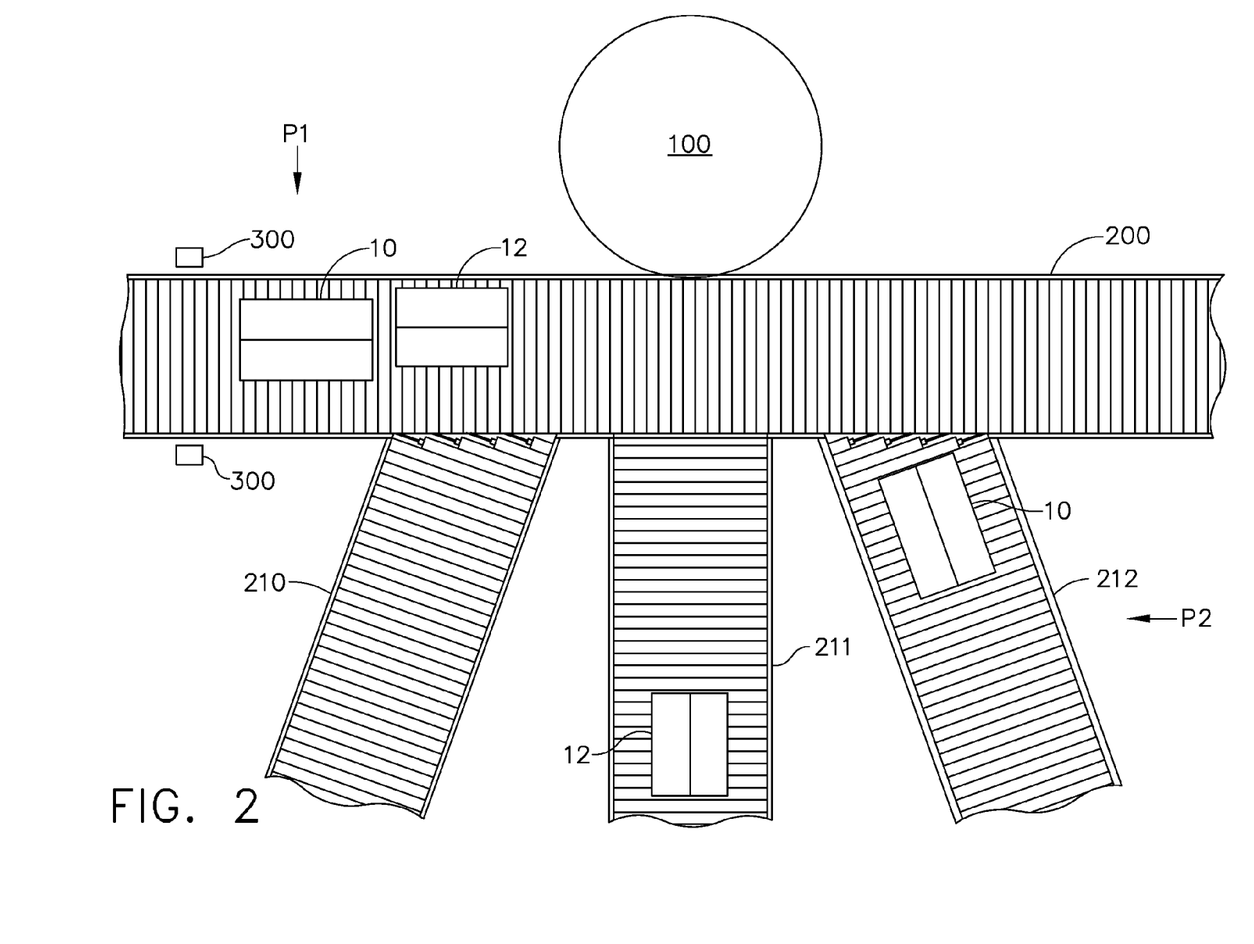
FIG. 2 is a plan view of the robotic line sorter of FIG. 1, wherein an article is moved from a main conveyor to a branch conveyor.
Figure 3:
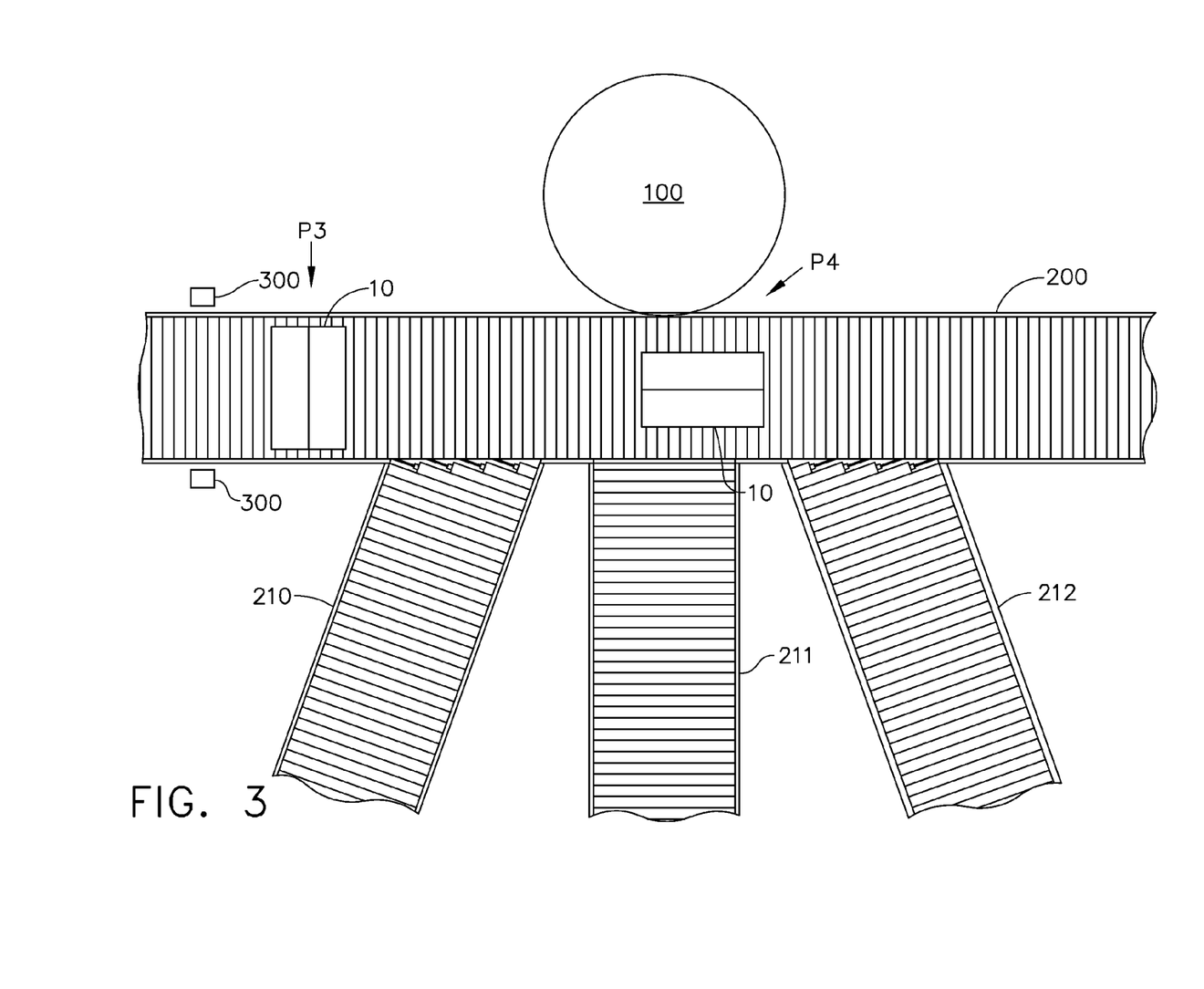
FIG. 3 is a plan view of the robotic line sorter of FIG. 1, wherein an article is adjusted on the main conveyor of FIG. 2.
Figure 4:
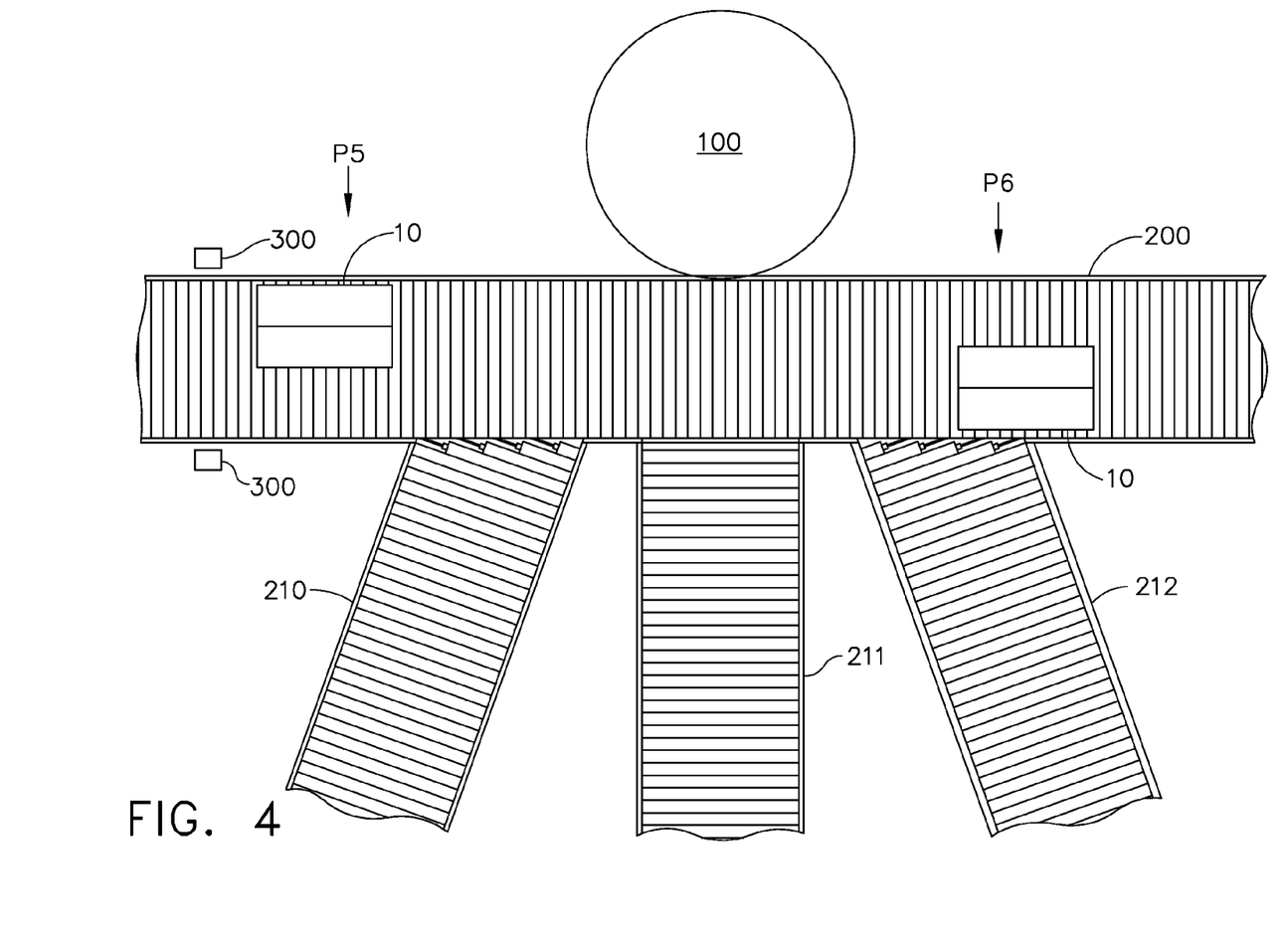
FIG. 4 is a plan view of the robotic line sorter of FIG. 1, wherein an article is aligned on the main conveyor of FIG. 2.
Figure 5:
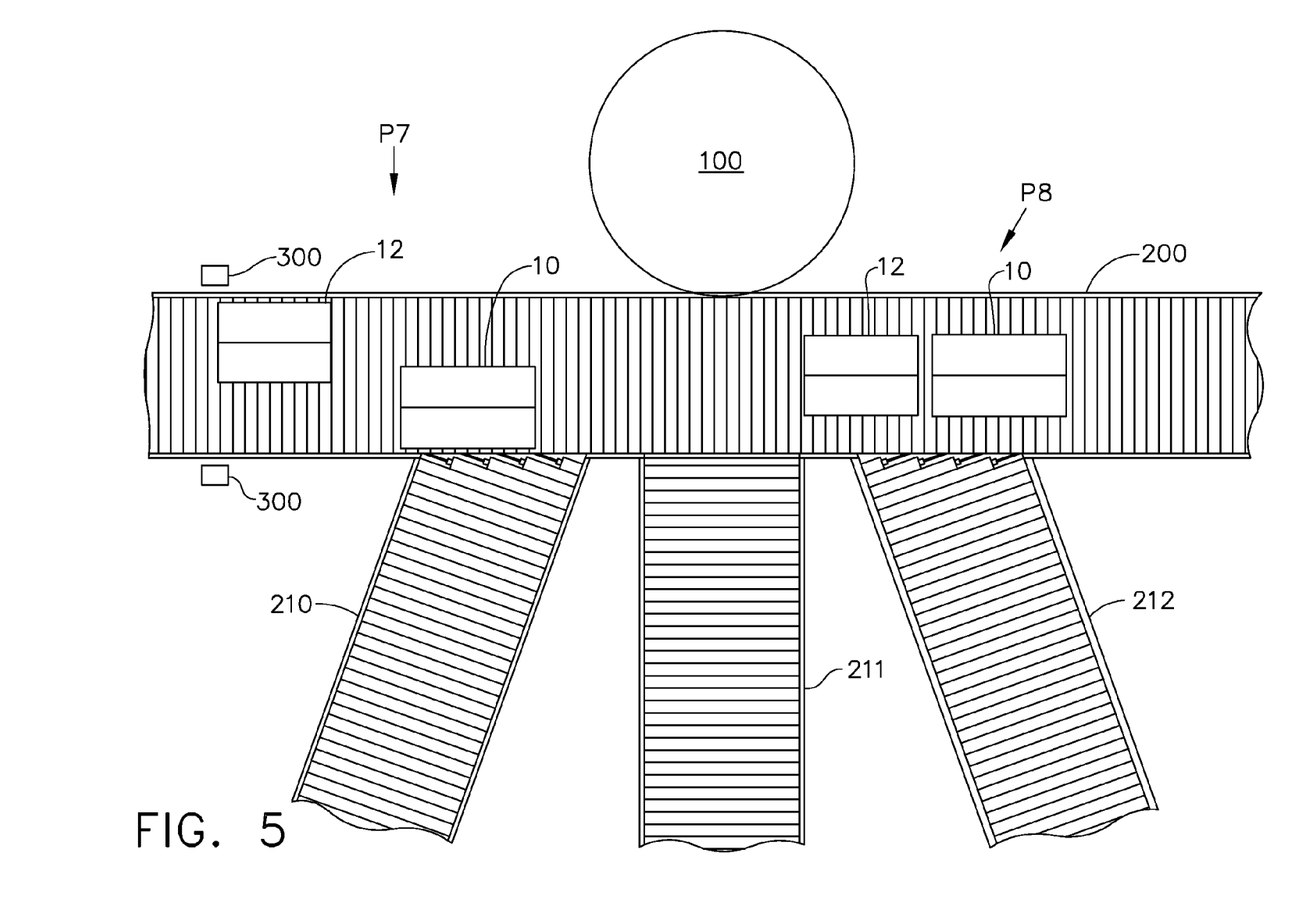
FIG. 5 is a plan view of the robotic line sorter of FIG. 1, wherein an article and another article are gapped and aligned on the main conveyor of FIG. 2.

As shown in FIGS. 1 and 2, robotic line sorter 100 is utilized to grasp and move article 10 from main conveyor 200 onto branch conveyors 210, 211, 212. Robotic arm 120 is also capable of adjusting the configuration of article 10 by rotating the orientation of article 10 from first orientation P3 to second orientation P4 as shown in FIG. 3. Robotic arm 120 is also capable of aligning article 10 by moving article 10 transversely or longitudinally along either main conveyor 200 or branch conveyors 210, 211, 212 from first position P5 to second position P6 as shown in FIG. 4. Robotic arm 120 is also capable of gapping article 10 and another article 12 and/or aligning article 10 with another article 12 by moving article 10 and/or another article 12 transversely or longitudinally along either main conveyor 200 or branch conveyors 210, 211, 212 from first position P7 to second position P8 as shown in FIG. 5. Finally, robotic arm 120 is capable of any combination of adjusting, aligning, gapping, and/or moving articles 10, 12 onto branch conveyors 210, 211, 212 as discussed above. Although robotic arm 120 of the present example is capable of the operations discussed above, robotic arm 120 may be capable of other operations that would be apparent to one skilled in the art.

Figure 13:
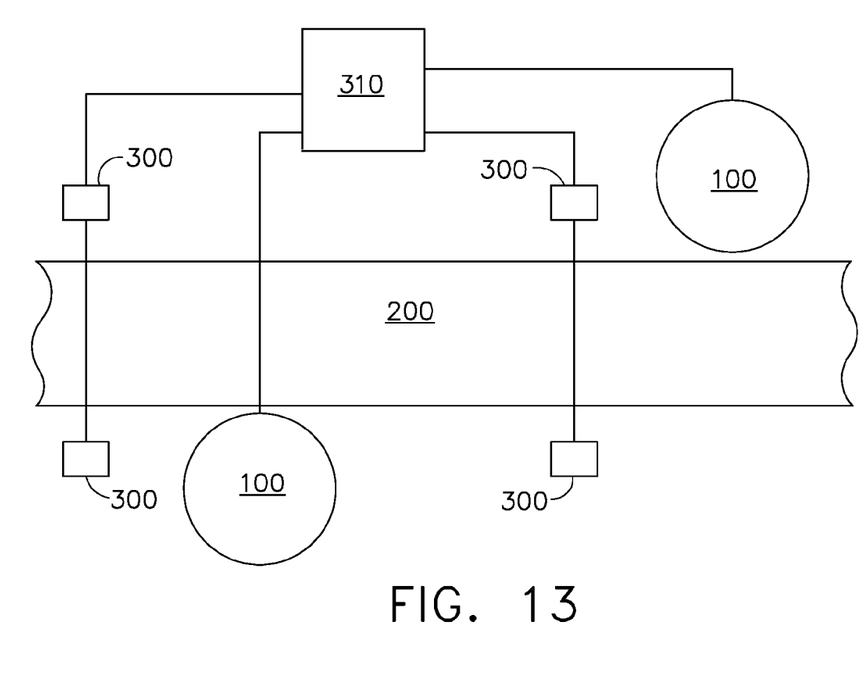
FIG. 13 is a schematic view of a sortation system.

As shown in FIGS. 1-5, scanner 300 may be placed along main conveyor 200. Scanner 300 may be capable of identifying a particular article 10 or articles 10 e.g. by stock-keeping unit "SKU" number by barcode, vision system, etc.; and communicating the identity and/or other information about articles 10 to controller 310 (see FIG. 13) which in turn communicates the identity and/or other information to robotic line sorter 100. For instance, in addition to the identity of article 10, scanner may communicate dimensions height, length, width, etc., weight, and/or fragility or durability of articles 10 among other information. Controller 310 may communicate directions to robotic line sorter 100 regarding the destination of articles 10 within the facility, the route articles 10 must take to reach that destination, and any actions robotic line sorter 100 must take to ensure articles 10 reaches that destination. For instance, controller 310 may direct robotic line sorter 100 to guide articles 10 onto branch conveyor 210. Alternatively, controller 310 may direct robotic line sorter 100 to allow articles 10 to remain on main conveyor 200. Controller 310 may also communicate information regarding the orientation, alignment, and/or clearance gap of articles 10 and communicate directions to robotic line sorter 100 regarding any combination of adjusting, aligning, gapping, and/or moving articles 10 as discussed above. It should be understood, that scanner 300 need not be placed immediately upstream of robotic line sorter 100 and may be placed at any appropriate location along conveyors 200, 210. It should also be understood, that a plurality of scanners 300 may be utilized to deliver information to controller 310 which in turn delivers information to a single robotic line sorter 100 or to a plurality of robotic line sorters 100 as shown in FIG. 13. Controller 310 may comprise one or more processors, and comprises at least part of a processing system which executes instructions that implement control logic.

Figure 6:
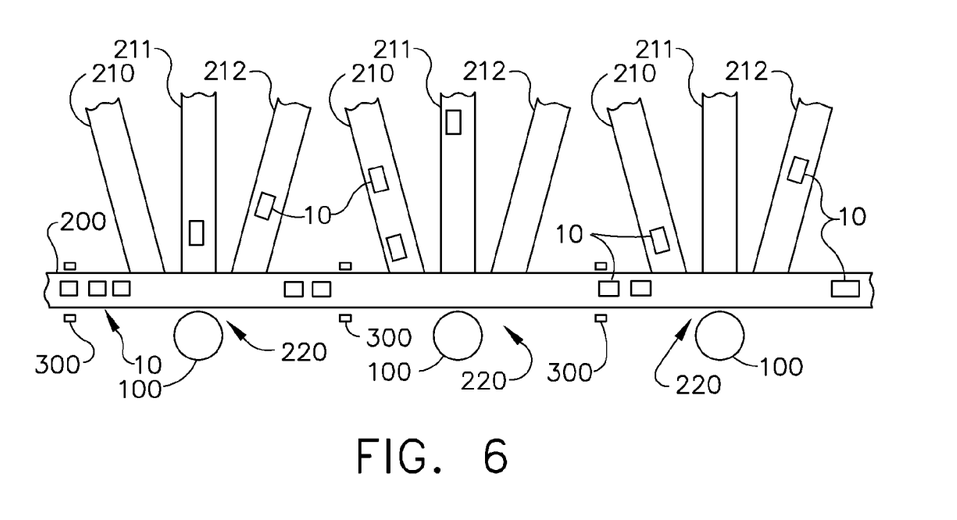
FIG. 6 is a plan view of the robotic line sorter of FIG. 1, in an orientation.

Main conveyor 200 and branch conveyors 210, 211, 212 may be arranged in an assortment of different orientations as shown in FIGS. 6-11. As shown in FIG. 6, robotic line sorter 100 may be utilized at stations 220 to move articles 10 from main conveyor 200 onto a variety of branch conveyors 210, 211, 212. Multiple stations 220 may be utilized along main conveyor 200. Scanners 300 may be placed upstream of each station 220 to relay information to controller 310 which in turn will deliver the information to each respective robotic line sorter 100.

Figure 7:
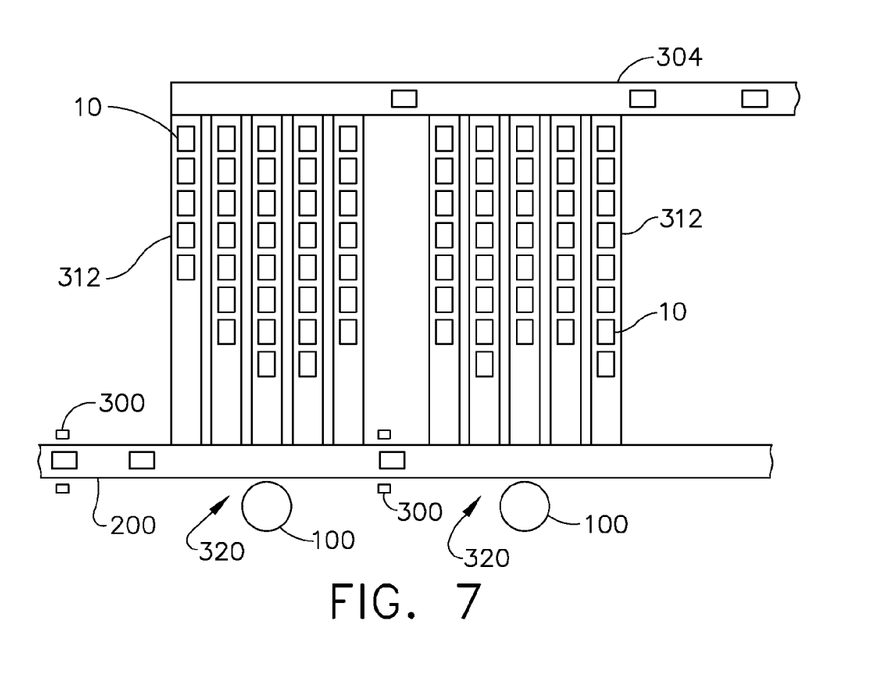
FIG. 7 is a plan view of the robotic line sorter of FIG. 1, in another orientation.

As shown in FIG. 7 robotic line sorter 100 may be utilized at stations 320 to move articles 10 from main conveyor 302 onto a variety of staging conveyors 312. Staging conveyors 312 may be configured to provide an area in which articles 10 may be grouped and/or configured to create a predetermined gap between consecutive articles 10 among other operations. Articles 10 may also be organized onto staging conveyors 312 based upon any criteria or characteristics such that all articles 10 on a single staging conveyor 312 meet the criteria or share a common characteristics. For instance, articles 10 may be organized by identity, dimensions, weight, fragility or durability, destination, and/or shipping date among other characteristics. Scanners 300 may be placed upstream of each station 320 to relay information to controller 310 which in turn will deliver the information to each respective robotic line sorter 100.

Figure 8:
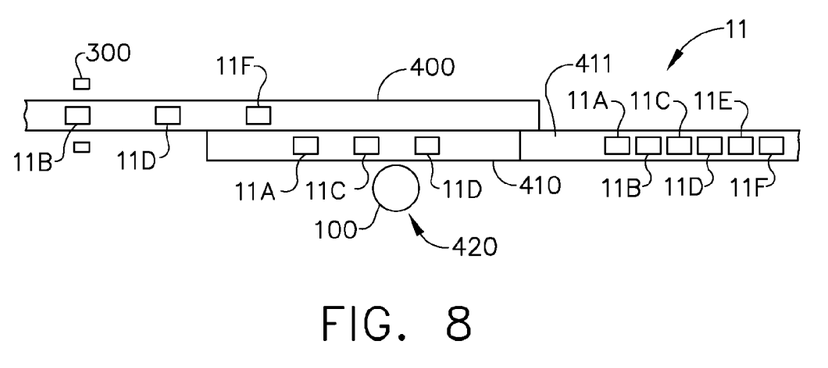
FIG. 8 is a plan view of the robotic line sorter of FIG. 1, in yet another orientation.

As shown in FIG. 8, robotic line sorter 100 may be utilized at transfer station 420 to move articles 11 from main conveyor 400 onto branch conveyor 410 which is parallel to main conveyor 400. In the present example, articles 11A, 11B, 11C, 11D, 11E, 11F are arranged into a group 11 by robotic line sorter 100 on branch conveyor 410 based on desired criteria. Group 11 comprises a plurality of articles 11A, 11B, 11C, 11D, 11E, 11F arranged in a predetermined order as shown in FIG. 8. It should be understood, however, that if not necessary, group 11 need not comprise articles 11A, 11B, 11C, 11D, 11E, 11F in a predetermined order, and may instead, comprise a specific number of articles 11A, 11B, 11C, 11D, 11E, 11F, or a specific total combined weight of articles 11A, 11B, 11C, 11D, 11E, 11F. Robotic line sorter 100 receives articles 11A, 11B, 11C, 11D, 11E, 11F from main conveyor 400 and arranges articles 11A, 11B, 11C, 11D, 11E, 11F on branch conveyor 410 as branch conveyor 410 remains stationary. Once articles 11A, 11B, 11C, 11D, 11E, 11F have been appropriately arranged by robotic line sorter 100, branch conveyor 410 moves group 11 onto a conveyor 411 such that branch conveyor 410 is capable of receiving more articles 11A, 11B, 11C, 11D, 11E, 11F from robotic line sorter 100. Scanners 300 may be placed upstream of transfer station 420 to relay information to controller 310 which in turn will deliver the information to each respective robotic line sorter 100.

Figure 9:
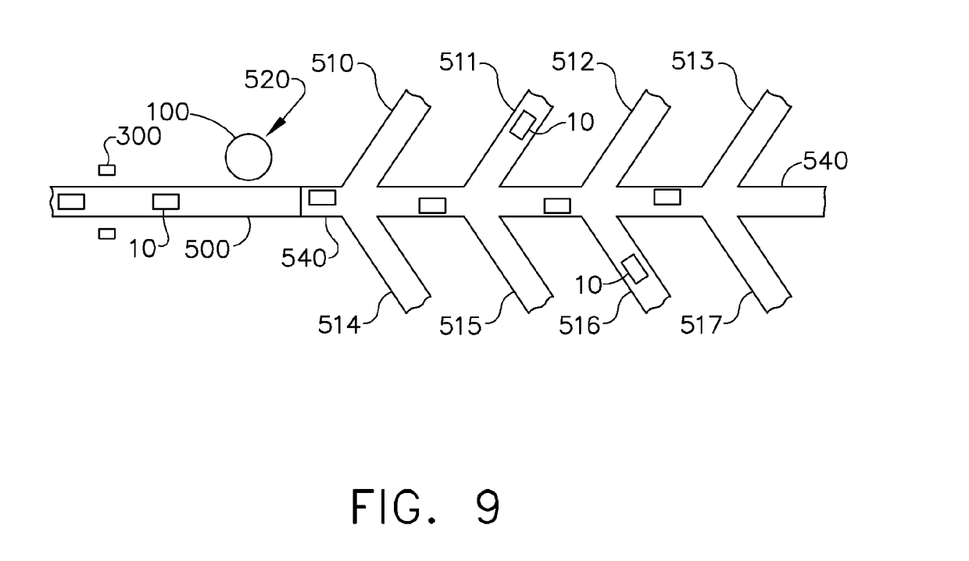
FIG. 9 is a plan view of the robotic line sorter of FIG. 1, in yet another orientation.

As shown in FIG. 9, robotic line sorter 100 is utilized at station 520 to adjust, align, gap, and/or move articles 10 along main conveyor 200. Such an orientation also comprises dual-sided sortation conveyor 540 wherein articles 10 are diverted onto branch conveyors 510, 511, 512, 513, 514, 515, 516, 517. Adjustment, alignment, gapping, and/or movement of articles 10 by robotic line sorter 100 increases efficiency and speed of the sortation which occurs on dual-sided sortation conveyor 540. Scanners 300 may be placed upstream of station 520 to relay information to controller 310 which in turn will deliver the information to each respective robotic line sorter 100.

Figure 10:
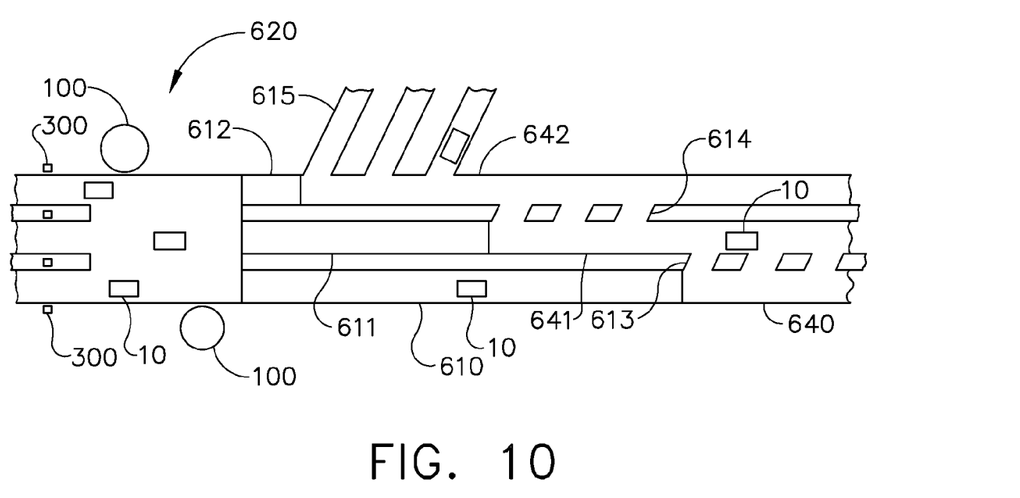
FIG. 10 is a plan view of the robotic line sorter of FIG. 1, in yet another orientation.

As shown in FIG. 10, a plurality of main conveyors 600, 602, 604 deliver articles 10 to a single station 620. Multiple robotic line sorters 100 are utilized at station 620 to adjust, align, gap, and/or move articles 10 onto a number of branch lines 610, 611, 612. Branch lines 610, 611, 612 comprise sortation conveyors 640, 641, 642 wherein articles 10 are diverted onto other branch conveyors 613, 614, 615 by way of a sortation device. Scanners 300 may be placed upstream of station 620 to relay information to controller 310 which in turn will deliver the information to each respective robotic line sorter 100.

Figure 11:
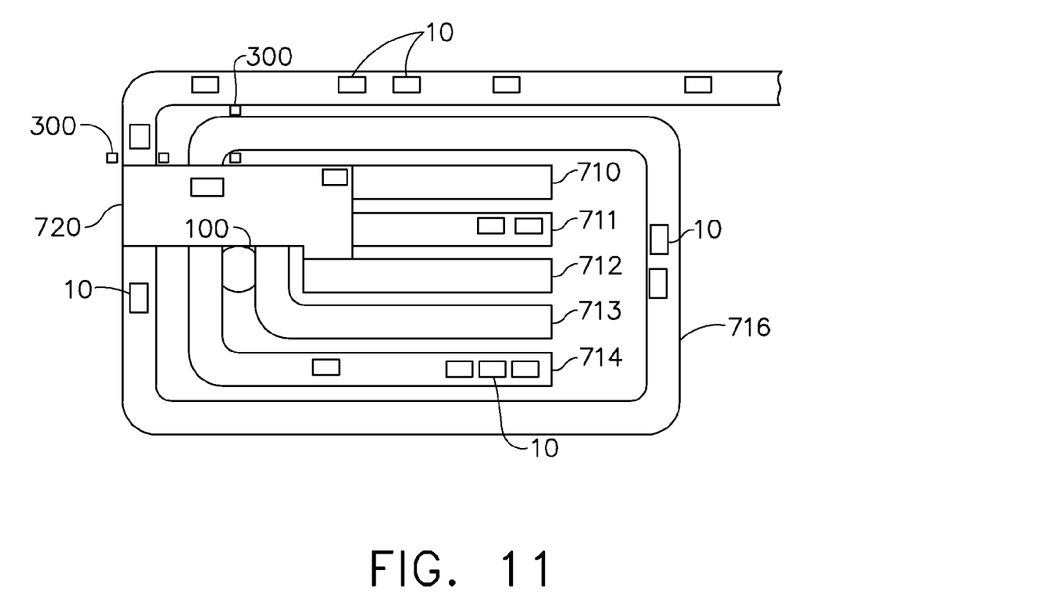
FIG. 11 is a plan view of the robotic line sorter of FIG. 1, in yet another orientation.

As shown in FIG. 11, robotic line sorter 100 is utilized at a single station 720 which is coupled with a number of staging conveyors 710, 711, 712, 713, 714. Such a configuration further comprises a recirculating conveyor 716 which creates a loop from station 720 around staging conveyors 710, 711, 712, 713, 714 and back to station 720. Robotic line sorter 100 is utilized at station 720 to adjust, align, gap, and/or move articles 10 onto staging conveyors 710, 711, 712, 713, 714. Staging conveyors 710, 711, 712, 713, 714 may be configured to provide an area in which articles 10 may be grouped and/or may be configured to create a predetermined gap between consecutive articles 10 among other operations. Articles 10 may also be organized onto staging conveyors 710, 711, 712, 713, 714 based upon any number of characteristic or characteristics such that all articles 10 on a single staging conveyor 710, 711, 712, 713, 714 share a common characteristics. For instance, articles 10 may be organized by identity, dimensions, weight, fragility or durability, destination, and/or shipping date among other characteristics. Scanners 300 may be placed upstream of station 720—including on the looping conveyor—to relay information to controller 310 which in turn will deliver the information to each respective robotic line sorter 100.

Figure 12:
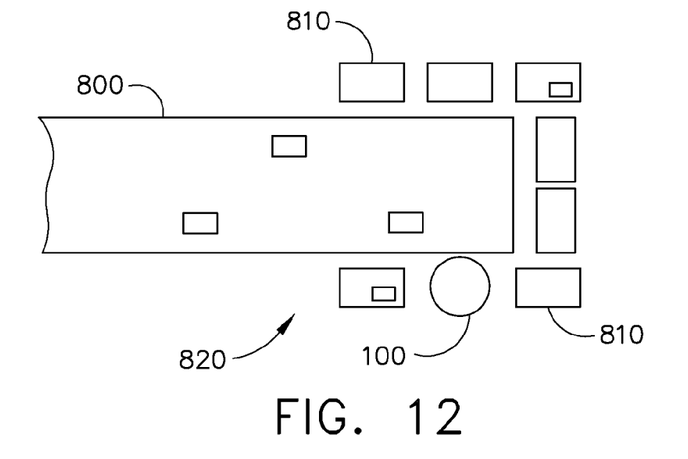
FIG. 12 is a plan view of the robotic line sorter of FIG. 1, in yet another orientation.

As shown in FIG. 12, robotic line sorter 100 is utilized at a single station 820 to move articles 10 into a plurality of containers 810. Containers 810 may be for instance boxes, totes, sacks, etc. Although robotic line sorter 100 of the present example receives articles 10 from main conveyor 800, robotic line sorter 100 may also receive articles 10 from a chute. Robotic line sorter 100 may be configured to stack articles 10 within containers 810 if necessary. Containers 810 may be configured to provide an area in which articles 10 may be grouped. Articles 10 may also be organized into containers 810 based upon any criteria or characteristics such that all articles 10 in a single container 810 meet the criteria or share a common characteristics. For instance, articles 10 may be organized by identity, dimensions, weight, fragility or durability, destination, and/or shipping date among other characteristics. Scanners 300 may be placed upstream of station 820 to relay information to controller 310 which in turn will deliver the information to robotic line sorter 100.

Although robotic line sorter 100 of the present example is capable being oriented in the configurations discussed above, and may be utilized and configured as discussed above, to sort, adjust, align, gap, and/or move articles 10, it should be understood that robotic line sorter 100 may be utilized and configured in any number of orientations and/or any number of operations which would be apparent to one skilled in the art.

In accordance with various aspects of the disclosure, an element, or any portion of an element, or any combination of elements may be implemented with a "processing system" that includes one or more physical devices comprising processors. Non-limiting examples of processors include microprocessors, microcontrollers, digital signal processors (DSPs), field programmable gate arrays (FPGAs), programmable logic devices (PLDs), programmable logic controllers (PLCs), state machines, gated logic, discrete hardware circuits, and other suitable hardware configured to perform the various functionality described throughout this disclosure. One or more processors in the processing system may execute instructions. A processing system that executions instructions to effect a result is a processing system which is configured to perform tasks causing the result, such as by providing instructions to one or more components of the processing system which would cause those components to perform acts which, either on their own or in combination with other acts performed by other components of the processing system would cause the result. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. Computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

EXPLICIT DEFINITIONS

"Processor" means devices which can be configured to perform the various functionality set forth in this disclosure, either individually or in combination with other devices. Examples of "processors" include microprocessors, microcontrollers, digital signal processors (DSPs), field programmable gate arrays (FPGAs), programmable logic devices (PLDs), programmable logic controllers (PLCs), state machines, gated logic, and discrete hardware circuits. The phrase "processing system" is used to refer to one or more processors, which may be included in a single device, or distributed among multiple physical devices.

"Instructions" means data which can be used to specify physical or logical operations which can be performed by a processor. Instructions should be interpreted broadly to include, code, code segments, program code, programs, subprograms, software modules, applications, software applications, software packages, routines, subroutines, objects, executables, threads of execution, procedures, functions, hardware description language, middleware, etc., whether encoded in software, firmware, hardware, microcode, or otherwise.

A statement that a processing system is "configured" to perform one or more acts means that the processing system includes data (which may include instructions) which can be used in performing the specific acts the processing system is "configured" to do. For example, in the case of a computer (a type of "processing system") installing Microsoft WORD on a computer "configures" that computer to function as a word processor, which it does using the instructions for Microsoft WORD in combination with other inputs, such as an operating system, and various peripherals (e.g., a keyboard, monitor, etc. . . . ).

The foregoing description has been presented for purposes of illustration and description. It is not intended to be exhaustive or to limit the invention to the precise form disclosed. Obvious modifications or variations are possible in light of the above teachings. The embodiment was chosen and described in order to illustrate the principles of the invention and its application to thereby enable one of ordinary skill in the art to utilize the invention in various embodiments and with various modifications as are suited to the particular use contemplated. Although only a limited number of embodiments of the invention is explained in detail, it is to be understood that the invention is not limited in its scope to the details of construction and arrangement of components set forth in the preceding description or illustrated in the drawings. The invention is capable of other embodiments and of being practiced or carried out in various ways. Also, specific terminology was used herein for the sake of clarity. It is to be understood that each specific term includes all technical equivalents which operate in a similar manner to accomplish a similar purpose. It is intended that the scope of the invention be defined by the claims submitted herewith.

We claim:

1. A material handling system comprising:
    a main conveyor;
    at least one branch conveyor comprising one or more accumulation conveyors that intersect with the main conveyor;
    a single staging conveyor that receives articles from the at least one branch conveyor;
    a sortation conveyor that receives the articles from the single staging conveyor and that sorts the articles to more than one divert location
    a robot, wherein the robot comprises: (i) a robotic arm, and (ii) an end effector, coupled to the robotic arm, wherein the robot is configured to move an article from the main conveyor to the at least one branch conveyor; and
    a controller in communication with the robot, wherein the controller comprises at least one processor that executes instructions to cause the robot to perform operations comprising:
        moving an article from the main conveyor to the at least one branch conveyor to accumulate articles; and
        adjusting the article to provide a selected one or more of a headroom gap with another article, a longitudinal alignment with a longitudinal axis of the branch conveyor, and lateral position on the branch conveyor to prepare the article for merging and sortation with accumulated articles on the at least one branch conveyor.

2. The material handling system of claim 1, wherein the robot is further operable to perform one or more of the functions of aligning, adjusting, or gapping an article or a plurality of articles, and wherein said operations comprise aligning, adjusting, or gapping an article or a plurality of articles.

3. The material handling system of claim 1, wherein the robot is configured to deliver a plurality of articles to the at least one branch conveyor in a predetermined order.

4. The material handling system of claim 1, wherein the at least one branch conveyor remains stationary as a plurality of articles is moved onto the at least one branch conveyor.

5. The material handling system of claim 1, wherein:
    the at least one branch conveyor intersects with the main conveyor at a non-perpendicular angle.

6. The material handling system of claim 1, wherein:
    the at least one branch conveyor comprises a plurality of branch conveyors that each intersect with the main conveyor within reach of the robot arm; and
    the robot is operable to move an article from the main conveyor to any branch conveyer of the plurality of branch conveyors.

7. The material handling system of claim 6, wherein the robot is configured to deliver an article to a particular branch conveyor of the plurality of branch conveyors based upon a predetermined characteristic.

8. A material handling system, comprising:
    a main conveyor that conveys articles comprising one or more of totes, containers, and boxes;
    more than one branch conveyor;
    a line sortation conveyor that receives the articles from the main conveyor and that sorts each article to a selected one of the more than one branch conveyor;
    a robot, wherein the robot comprises: (i) a robotic arm, and (ii) an end effector, coupled to the robotic arm, wherein the robot is positioned within reach of the main conveyor; and
    a controller in communication with the robot, wherein the controller comprises at least one processor that executes instructions to cause the robot to selectively perform operations comprising adjusting an orientation of the article relative to one of the main conveyor and another article to prepare the article for sortation by the line sortation conveyor.

9. The material handling system of claim 8, wherein adjusting the orientation comprises aligning a longitudinal orientation of the article with a longitudinal axis of the main conveyor.

10. The material handling system of claim 8, wherein adjusting the orientation comprises adjusting a lateral position on the main conveyor.

11. The material handling system of claim 8, wherein adjusting the orientation comprises turning a longitudinal orientation of the article perpendicular to a longitudinal axis of the main conveyor.

12. The material handling system of claim 8, wherein adjusting the orientation comprises longitudinally adjusting a gap between the article and an adjacent article on the main conveyor.

* * * * *